United States Patent
Haga et al.

(10) Patent No.: US 8,028,518 B2
(45) Date of Patent: Oct. 4, 2011

(54) SULFUR PURGE CONTROL DEVICE FOR AN INTERNAL COMBUSTION ENGINE

(75) Inventors: Hisao Haga, Wako (JP); Norio Suzuki, Wako (JP); Katsuji Wada, Wako (JP); Nobuhiro Komatsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 427 days.

(21) Appl. No.: 11/882,255

(22) Filed: Jul. 31, 2007

(65) Prior Publication Data
US 2008/0028749 A1    Feb. 7, 2008

(30) Foreign Application Priority Data

Aug. 1, 2006  (JP) ................................. 2006-209495

(51) Int. Cl.
*F01N 3/00* (2006.01)
(52) U.S. Cl. ............... 60/295; 60/274; 60/276; 60/277; 60/285
(58) Field of Classification Search .............. 60/274, 60/276, 277, 285, 286, 295, 297
See application file for complete search history.

(56) References Cited

U.S. PATENT DOCUMENTS

| | | | | |
|---|---|---|---|---|
| 5,577,382 | A * | 11/1996 | Kihara et al. ............... | 60/276 |
| 5,970,707 | A * | 10/1999 | Sawada et al. .............. | 60/277 |
| 6,272,848 | B1 * | 8/2001 | Okude et al. ............... | 60/274 |
| 6,341,487 | B1 * | 1/2002 | Takahashi et al. ........... | 60/286 |
| 6,574,955 | B2 * | 6/2003 | Schroder et al. ............ | 60/295 |
| 6,637,189 | B1 * | 10/2003 | Boegner et al. ............. | 60/274 |
| 6,637,198 | B2 * | 10/2003 | Hertzberg ................... | 60/295 |
| 6,854,266 | B2 * | 2/2005 | Schnaibel et al. ............ | 60/295 |
| 6,973,775 | B2 * | 12/2005 | Hoffmann et al. ............ | 60/286 |
| 7,121,086 | B2 * | 10/2006 | Nishii et al. ................ | 60/295 |
| 7,191,590 | B2 * | 3/2007 | Nagaoka et al. ............. | 60/285 |
| 7,207,171 | B2 * | 4/2007 | Nagaoka et al. ............. | 60/295 |
| 7,509,801 | B2 * | 3/2009 | Asanuma ................... | 60/285 |
| 7,654,076 | B2 * | 2/2010 | Wills ........................ | 60/274 |
| 7,707,826 | B2 * | 5/2010 | Wang et al. ................. | 60/295 |
| 2004/0011028 | A1 | 1/2004 | Schnailbel et al. | |

FOREIGN PATENT DOCUMENTS

| | | |
|---|---|---|
| EP | 1 510 671 A2 | 3/2005 |
| EP | 1 529 933 A1 | 5/2005 |
| JP | 2000-110552 A | 4/2000 |
| JP | 2001-3782 A | 1/2001 |
| JP | 2001-152837 A | 6/2001 |
| JP | 2001-173498 A | 6/2001 |
| JP | 2003-328739 A | 11/2003 |
| JP | 2005-113763 A | 4/2005 |
| JP | 2005-139968 A | 6/2005 |
| JP | 2005-180324 A | 7/2005 |

* cited by examiner

*Primary Examiner* — Tu Nguyen
(74) *Attorney, Agent, or Firm* — Arent Fox LLP

(57) ABSTRACT

In a control device for an internal combustion engine provided with a NOX catalytic converter in an exhaust passage thereof, the progress of sulfur purging is computed from the consumption of reducing agent contained in the exhaust gas in the NOX catalytic converter. This computation may be based on the air fuel ratio of exhaust gas upstream of the NOX catalytic converter and the estimated consumption of the reducing agent contained in the exhaust gas or on the difference between the air fuel ratios of exhaust gas upstream and downstream of the NOX catalytic converter. In either case, the accuracy can be improved by taking into account the space velocity of the exhaust gas.

6 Claims, 6 Drawing Sheets

SULFUR PURGE CONTROL DEVICE FOR AN INTERNAL COMBUSTION ENGINE

TECHNICAL FIELD

The present invention relates to a control device for an internal combustion engine, and in particular to a control device for an internal combustion engine which is configured to execute a process for removing sulfur contents from a catalytic converter for eliminating nitrogen oxides from exhaust gas.

BACKGROUND OF THE INVENTION

The exhaust passage of a diesel engine is sometimes fitted with a lean NOx catalytic converter (referred to as LNC hereinafter) for reducing and eliminating nitrogen oxides (referred to as NOx hereinafter) from the exhaust gas. In an LNC, NOx is absorbed when the air fuel ratio of the exhaust gas (referred to exhaust A/F hereinafter) is higher than a prescribed level (referred to as a lean condition hereinafter) or when the oxygen content of the exhaust gas is high, and the absorbed NOx is released and reduced to a harmless form when the exhaust A/F is higher than the prescribed level (referred to as a rich condition hereinafter) or when the oxygen content of the exhaust gas is low. Because the capability of the LNC to absorb NOx diminishes as the build up of the NOx therein increases, the combustion state is varied so that the concentration of the reducing agents such as CO and HC is increased while the oxygen concentration is decreased. Thereby, the release of NOx from the LNC is enhanced, and the reduction of the NOx is promoted.

Because the fuel includes sulfur contents, sulfur oxides (referred to as SOx hereinafter) and hydrogen sulfide (referred to as $H_2S$ hereinafter) are also emitted with the exhaust gas. When such sulfur contents are absorbed by the LNC, the capability of the LNC to absorb NOx diminishes. Therefore, it is necessary to release the sulfur contents absorbed in the LNC from time to time. The process of releasing sulfur contents from a LNC (referred to as sulfur purging hereinafter) is typically executed by enriching the exhaust A/F and causing the LNC temperature to rise by carrying out an auxiliary fuel injection following the combustion (referred to as post injection hereinafter) in addition to the main fuel injection that is carried out during the intake stroke and thereby supplying unburned fuel to the exhaust passage and heating the LNC beyond a prescribed temperature (see Japanese patent laid open publication Number 2001-173498).

As a sulfur purging adversely affects the fuel economy and causes a thermal degradation of the LNC, it is not desirable to conduct a sulfur purging to an excessive extent. Therefore, it is desired to accurately determine the completion of a sulfur purging process. It is known to estimate the accumulation of SOx from fuel consumption and estimate the expected extent of the release of SOx during a sulfur purging process. Once the estimated extent of the release of SOx reaches prescribed level, the sulfur purging process is terminated. See Japanese patent laid open publication Number 2000-110552. It is also known to provide a SOx sensor at each of the inlet and outlet of the LNC and terminate the sulfur purging process when the accumulated amount of SOx in the LNC falls below a prescribed level. See Japanese patent laid open publication Number 2001-003782.

However, as the method described in Japanese patent laid open publication Number 2000-110552 is based on estimation, it is possible that the sulfur purging may be terminated prematurely or that the sulfur purging may be uselessly continued long after the sulfur purging is complete.

The method described in Japanese patent laid open publication Number 2001-003782 may allow the completion of sulfur purging at a high precision, but because a plurality of sensors must be arranged one next to the other, there may be a problem in securing an adequate mounting space, and the manufacturing cost may be undesirably high.

BRIEF SUMMARY OF THE INVENTION

In view of such problems of the prior art, a primary object of the present invention is to provide a control device for an internal combustion engine that can accurately execute a sulfur purge of a LNC without requiring a complicated structure or increasing the manufacturing cost.

A second object of the present invention is to provide a control method that allows a sulfur purge of a LNC to be carried out without requiring a complicated structure or increasing the manufacturing cost.

To achieve such objects, the present invention provides a control device for an internal combustion engine provided with a NOX catalytic converter (LNC) in an exhaust passage thereof, comprising: a control unit that estimates an extent of sulfur deposition in the NOX catalytic converter and changes operating parameters of the engine so as to produce a reducing agent in exhaust gas and thereby purge a sulfur content in the NOX catalytic converter; and a first detector for detecting a value corresponding to an air fuel ratio in an upstream part of the NOX catalytic converter; wherein the control unit determines an end of a sulfur purge process according to an output value of the first detector.

Also, the present invention provides a method for controlling a sulfur purge in an internal combustion engine provided with a NOX catalytic converter in an exhaust passage thereof, comprising: estimating an extent of sulfur deposition in the NOX catalytic converter; changing operating parameters of the engine from normal values so as to produce a reducing agent from exhaust gas in the exhaust passage and thereby carry out a sulfur purge in the NOX catalytic converter; detecting an upstream air fuel ratio value corresponding to an air fuel ratio in an upstream part of the NOX catalytic converter; and ending the sulfur purge when a cumulative value based on the value given by a mathematical function of the detected air fuel ratio value in an upstream part of the NOX catalytic converter has reached a prescribed threshold value.

Thus, according to the present invention, by monitoring the extent of sulfur poisoning and computing the amount of the reducing agent required for sulfur purging the monitored extent of sulfur poisoning to use the computed amount as a reference value for determining the completion of the sulfur purge, the time duration of the sulfur purging can be optimized even when the extent of sulfur poisoning varies and/or even when any deliberate sulfur purging control process is not being executed (under a natural purge enabling condition). Also, because there is no need for a sensor for detecting sulfur contents, there is no such problems as an increased manufacturing cost and the need for a significant mounting space.

The progress of sulfur purging can be monitored either by integrating a difference between the upstream air fuel ratio value and a prescribed reference value or a difference between the detected upstream and downstream air fuel ratio values. "Integrating" as used herein includes all kinds of adding up or accumulating values over time as well as the mathematical process of integration.

When the progress of sulfur purging is monitored by integrating a difference between the upstream air fuel ratio value and a prescribed reference value, it is desirable to take into account the CO consumption rate because the performance of CO varies depending on various parameters such as the temperature in the LNC. Also, in either case, the space velocity of exhaust gas that enters the NOX catalytic converter has a direct influence on the progress of sulfur purging, it is desirable to taking into account the detected space velocity in determining an end of a sulfur purge process.

In short, according to the present invention, in a control device or method for an internal combustion engine provided with a NOX catalytic converter in an exhaust passage thereof, the progress of sulfur purging is computed from the consumption of reducing agent contained in the exhaust gas in the NOX catalytic converter. This computation may be based on the air fuel ratio of exhaust gas upstream of the NOX catalytic converter and the estimated consumption of the reducing agent contained in the exhaust gas or on the difference between the air fuel ratios of exhaust gas upstream and downstream of the NOX catalytic converter. In either case, the accuracy can be improved by taking into account the space velocity of the exhaust gas.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
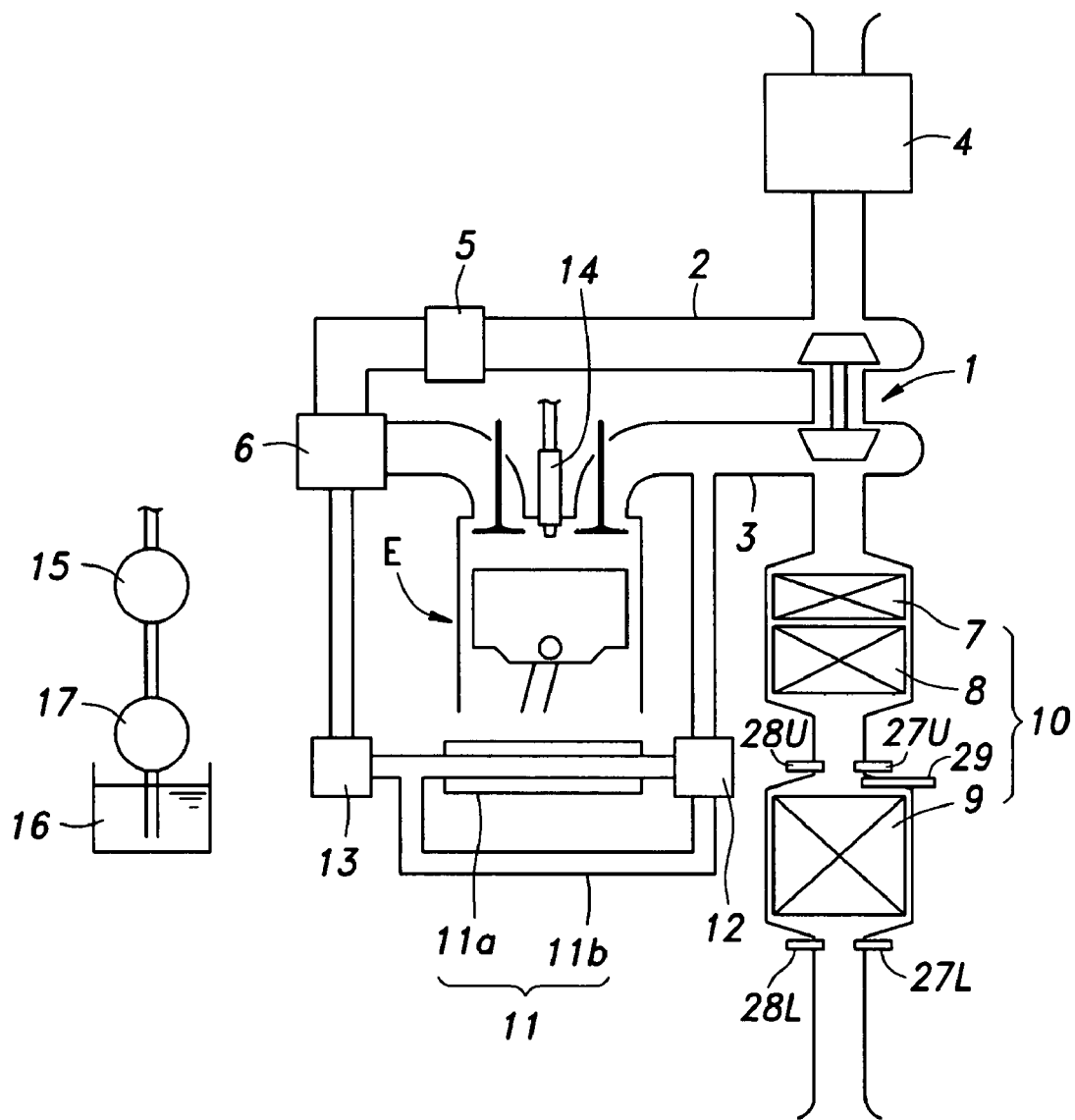
FIG. 1 is an overall structural view of an internal combustion engine to which the present invention is applied.

FIG. 1 is a view showing the basic structure of an internal combustion engine E to which the present invention is applied. This engine (diesel engine) E is not different from conventional engines as far as the mechanical structure is concerned, and is provided with a turbocharger 1 equipped with a variable boost pressure mechanism. An intake passage 2 is connected to a compressor end of the turbocharger 1, and an exhaust passage 3 is connected to a turbine end of the turbocharger 1. An air cleaner 4 is connected to the upstream end of the intake passage 2, and in appropriate parts of the intake passage 2 are provided an intake control valve 5 for controlling the flow rate of the fresh air that flows into a combustion chamber and a swirl control valve 6 for increasing the flow speed of the intake flow by restricting the cross sectional area of the passage under a low speed, partial load condition. To the downstream end of the exhaust passage 3 is connected an exhaust cleaning system 10 comprising a diesel oxidation catalytic converter (DOC) 7, a diesel particulate filter (DPF) 8 for removing particulate substances such as soot and a lean NOx catalytic converter (LNC) 9 discussed above that are connected in that order.

The swirl control valve 6 and a part of the exhaust passage 3 immediately downstream of the combustion chamber are connected to each other via an exhaust gas recirculating (EGR) passage 11. The EGR passage 11 comprises a cooler passage 11a and a bypass passage 11b that bifurcate at a switching valve 12 (provided at an exhaust end thereof) and merge at an EGR control valve 13 (provided at an intake end thereof) for controlling the amount of EGR gas that flows into the combustion chamber.

The cylinder head of the internal combustion engine E is provided with a fuel injection valve 14 having a free end projecting into the combustion chamber. This fuel injection valve 14 is connected to a common rail 15 which is in turn connected to a fuel pump 17 and receives fuel at a prescribed high pressure. The fuel pump 17 is actuated by the crankshaft and draws fuel from a fuel tank 16.

Figure 2:
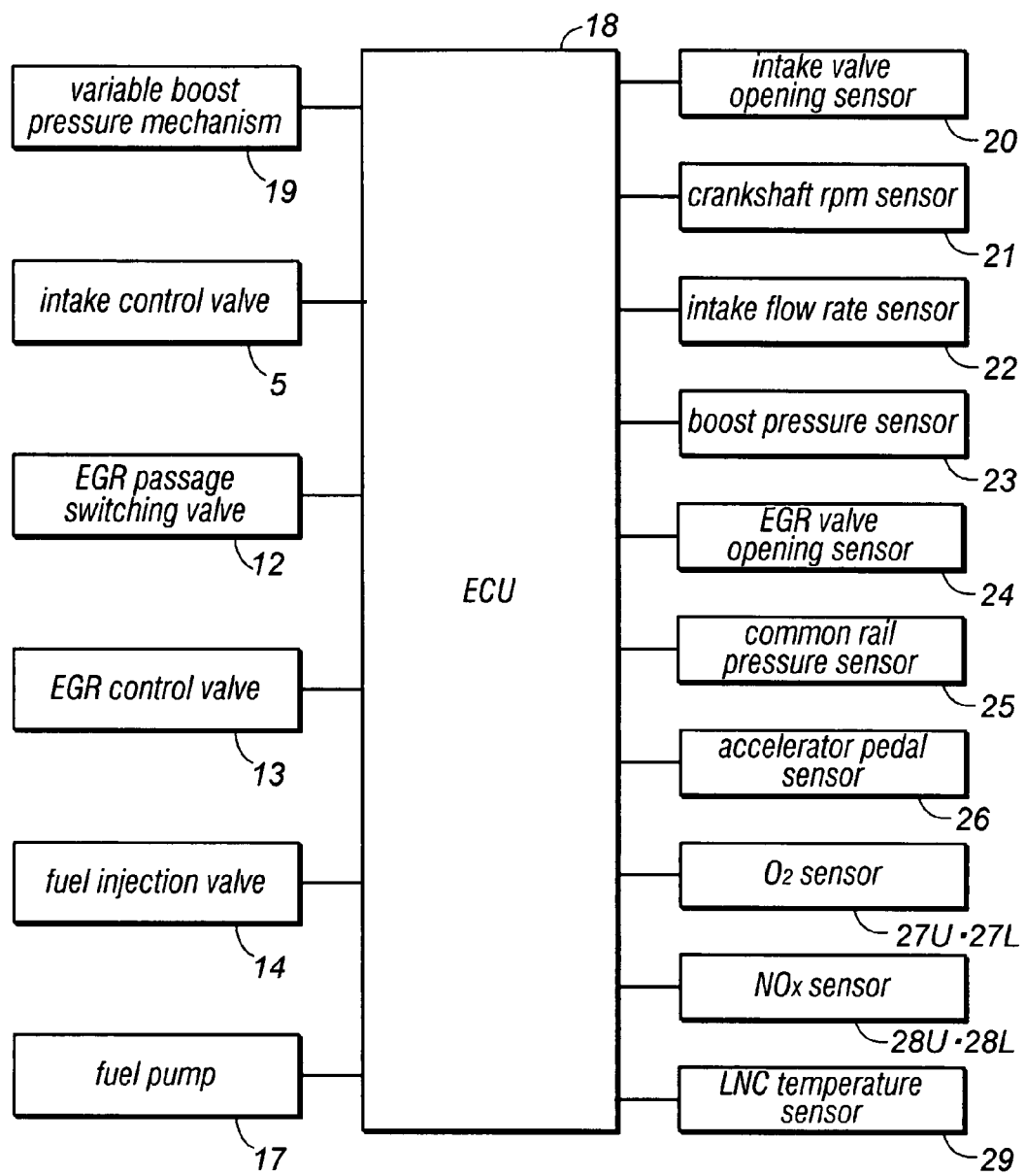
FIG. 2 is a block diagram of the control unit according to the present invention.

The variable boost pressure mechanism 19, intake control valve 5, EGR passage switching valve 12, EGR control valve 13, fuel injection valve 14, fuel pump 17 and so on are configured to operate according to control signals forwarded from an electronic control unit (ECU) 18 (see FIG. 2).

The ECU 18 in turn receives output signals from an intake valve opening sensor 20, crankshaft rotational speed sensor 21, intake flow rate sensor 22, boost pressure sensor 23, EGR valve opening sensor 24, common rail pressure sensor 25, accelerator pedal sensor 26, $O_2$ sensors 27U and 27L, NOx sensors 28U and 28L, LNC temperature sensor 29 and so on that are provided in appropriate parts of the engine E.

The memory of the ECU 18 stores maps for the target values of various control objects including an optimum fuel injection for each given crankshaft rotational speed and torque demand (accelerator pedal displacement) which is typically determined experimentally so that the various control objects may be optimally controlled and an optimum combustion state may be achieved under all load conditions of the internal combustion engine E.

The control flow relating to the sulfur purge action of the present invention is described in the following with reference to FIG. 3.

First of all, the extent of sulfur poisoning of the LNC 9 is estimated, and the corresponding amount of a reducing agent required for the sulfur purging is computed (step 1).

Figure 4:
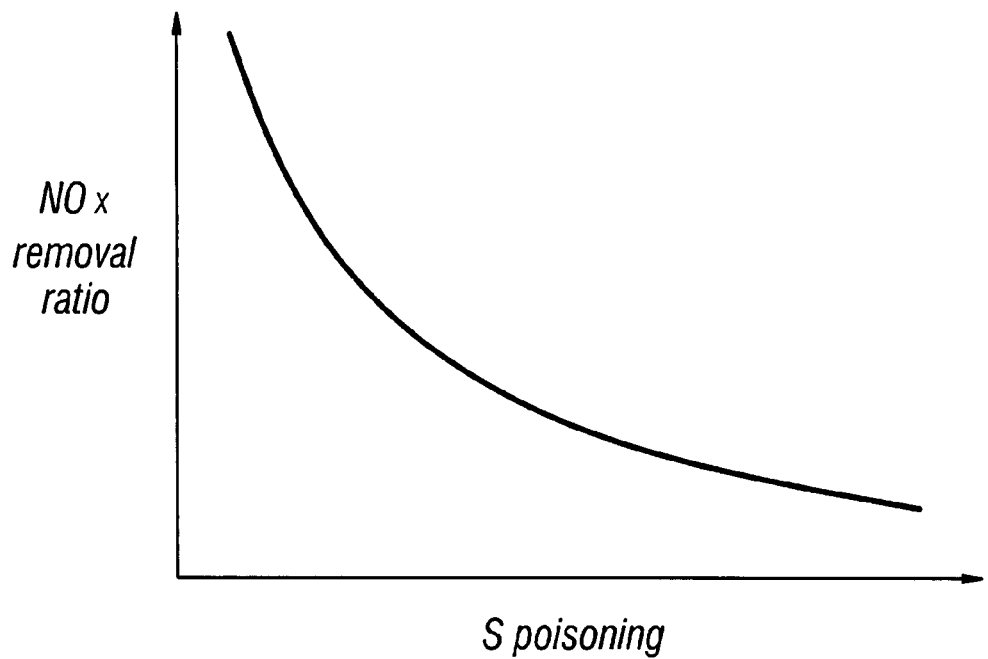
FIG. 4 is a graph showing the relationship between the extent of sulfur poisoning and NOx removal ratio.
Figure 5:
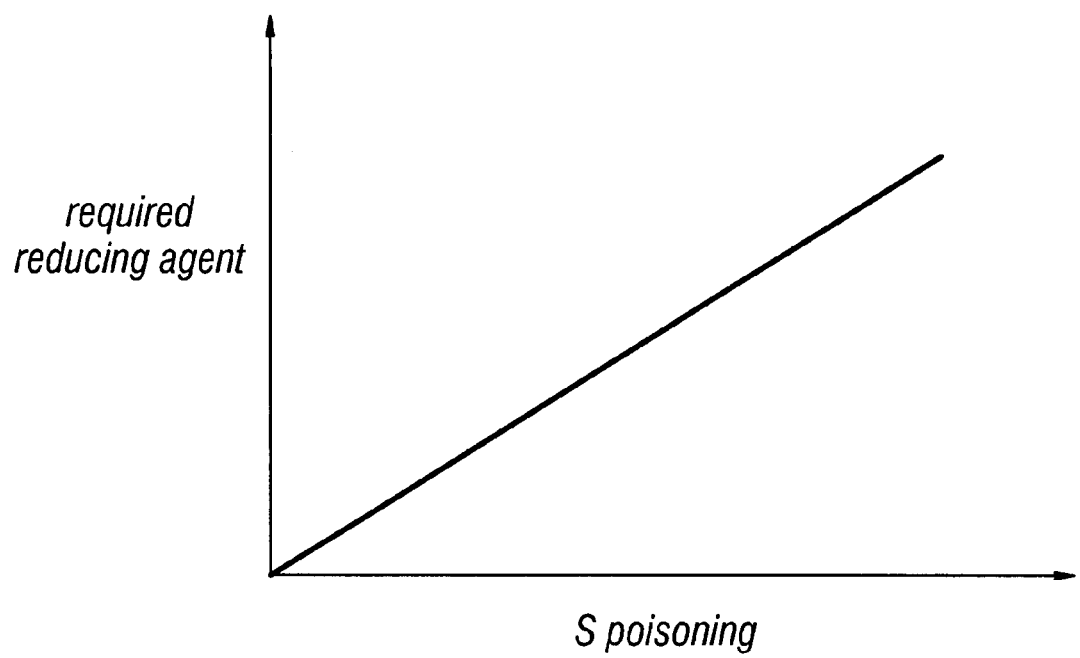
FIG. 5 is a graph showing the relationship between the extent of sulfur poisoning and the required amount of a reducing agent for the sulfur purging.

The extent of sulfur poisoning is inversely proportional to the NOx removal rate in the LNC 9 as shown in FIG. 4. In other words, the higher the NOx removal rate is, the extent of sulfur poisoning is lower, and the NOx removal rate diminishes as the extent of sulfur poisoning advances. Therefore, it is possible to estimate the extent of sulfur poisoning from the level of the NOx removal rate. The NOx removal rate can be computed from the ratio of the outputs of the two NOx sensors 28U and 28L provided at the upstream end (inlet) and downstream end (outlet) of the LNC 9, respectively. As the amount of the reducing agent that is required for the sulfur purging is proportional to the extent of sulfur poisoning (FIG. 5), the required amount of the reducing agent can be readily computed from the extent of sulfur poisoning. The extent of sulfur poisoning of the LNC 9 can also be estimated from the driving mileage, driving time period and fuel consumption.

It is then determined if the estimated extent of sulfur poisoning has exceeded a prescribed level (step 2). If the estimated extent of sulfur poisoning has exceeded the prescribed level, a sulfur purge is executed, and it is determined if the temperature of the LNC 9 is high enough to enable a sulfur purge from the output value of the LNC temperature sensor 29 provided upstream of the LNC 9 (step 3). If the output value of the LNC temperature sensor 29 is below a prescribed level (650° C., for instance), a temperature increase control is executed (step 4).

The temperature increase control consists of a feedback control for maintaining the LNC temperature at a level suitable for a sulfur purge by suitably combining the delaying of the main injection timing, increasing the post injection and reducing the intake air.

If the temperature of the LNC 9 is high enough for a sulfur purge, an exhaust A/F enriching control for a sulfur purge is executed (step 5). This exhaust A/F enriching control is essentially similar to the temperature increase control, but involves a further increase in the post injection and a further reduction in the intake air as compared with the temperature increase control.

If the LNC 9 is under a rich condition suitable for a sulfur purge, the output signals of the two $O_2$ sensors 27U and 27L provided at the upstream and downstream ends of the LNC 9, respectively, are monitored, and the amount of the reducing agent that has been supplied to the LNC 9 is estimated according to an integrated value of the difference between the output of the upstream $O_2$ sensor 27U and a prescribed reference value (corresponding to a stoichiometric condition) (step 6), or the consumption of the reducing agent in the LNC 9 is estimated from an integrated value of the difference between the outputs of the upstream $O_2$ sensor 27U and downstream $O_2$ sensor 27L (step 7). The integrated value is monitored and compared with the required amount of the reducing agent obtained in step 1 (steps 8 and 9), and a sulfur purge end signal is produced when the integrated value has reached the required amount of the reducing agent (step 10).

More specifically, as the exhaust A/F ratio can be determined from the oxygen concentration in the exhaust gas, the amount of the reducing agent that has been supplied to the LNC 9 can be determined from an integrated value of the difference between the output of the upstream $O_2$ sensor 27U and a prescribed reference value (corresponding to a stoichiometric condition), and the consumption of the reducing agent in the LNC 9 can be determined from the integrated value of the difference between the outputs of the upstream $O_2$ sensor 27U and downstream $O_2$ sensor 27L, the amounts of the reducing agent that are supplied and consumed can be determined by monitoring the outputs of the two $O_2$ sensor during the process of sulfur purging. In particular, if the amount of the reducing agent required for sulfur purging a catalytic converter that has incurred a certain extent of sulfur poisoning is determined in advance, the end of the process of sulfur purge can be determined as the time point at which the supply or consumption of the reducing agent has reached the required amount.

It is possible to determine the end of the process of sulfur purging from either of the supply or consumption of the reducing agent, but the precision in the estimation can be improved by comparing the results based on both the supply and consumption of the reducing agent.

Figure 6:
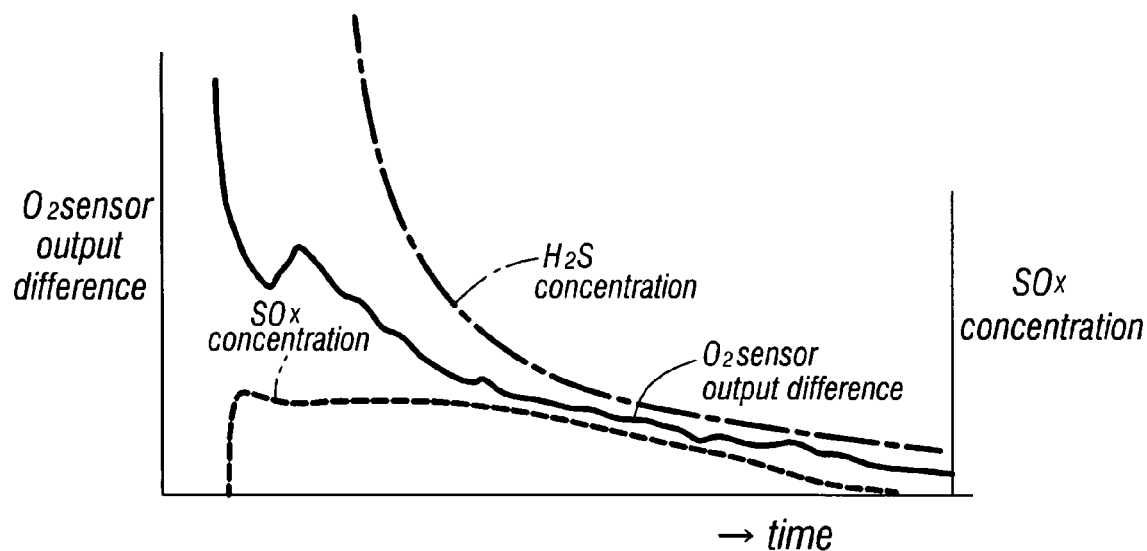
FIG. 6 is a graph showing the relationship between the difference of the outputs of the two $O_2$ sensors and sulfur concentration.

FIG. 6 shows the time history of the difference between the outputs of the two $O_2$ sensors 27U and 27L provided in the upstream and downstream ends of the LNC 9, respectively, and the sulfur concentrations during a sulfur purge process. The difference between the outputs of the two $O_2$ sensors 27U and 27L is significant in an early stage of the sulfur purging process, but, as the sulfur purging process progresses and the SOx concentration or $H_2S$ concentration diminishes, progressively diminishes. It means that the release of sulfur can be estimated from the difference between the outputs of the two $O_2$ sensors.

Figure 7:
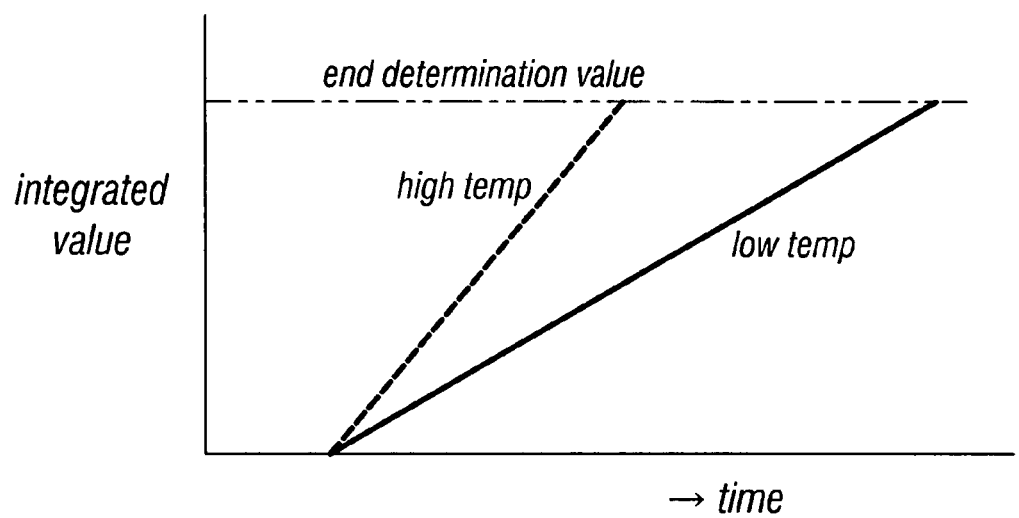
FIG. 7 is a graph showing the relationship between the sulfur purge speed and LNC temperature.
Figure 8:
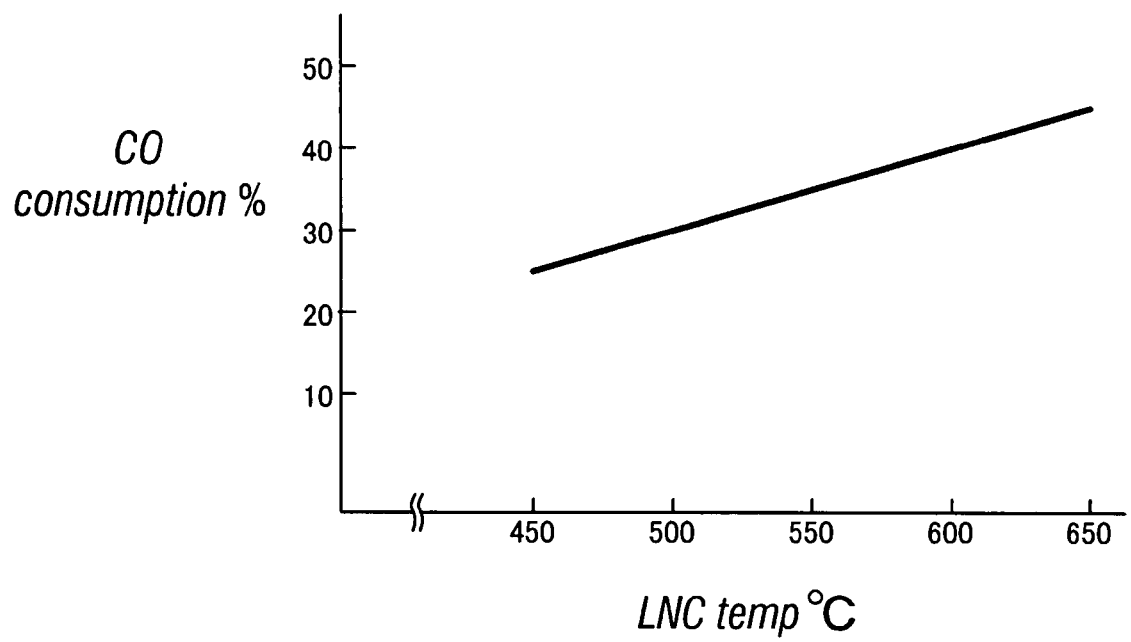
FIG. 8 is a graph showing the relationship between the CO consumption and LNC temperature.

As shown in FIG. 7, the higher the temperature of the LNC 9 is, the less time is required for the sulfur purging processing thereof. It relates to the consumption rate of CO which acts as a reducing agent in the LNC 9. More specifically, the higher the LNC temperature is, the greater is the CO consumption rate as shown in FIG. 8. In other words, the consumption of the reducing agent can be accurately evaluated by multiplying the CO consumption rate obtained from the LNC temperature to the integrated value of the difference between the two $O_2$ sensors and judging the reducing agent consumption from the multiplied value, instead of judging it only from the integrated value.

Because the supply of the reducing agent increases as the space velocity SV gets higher, by taking into account the space velocity SV, the supply (consumption) of the reducing agent can be accurately evaluated and the completion of the sulfur purging in the LNC can be judged even more accurately. The space velocity as used herein consists of a normalized value given the ratio of the space velocity of the supplied reducing agent to the volume of the LNC:

(intake air volume+supplied fuel)/LNC volume

The intake air volume is given as an output of the intake flow rate sensor 22, and the supplied fuel is given as an estimated value based on the control value of the fuel injection valve 13 given by the ECU 18 in dependence on the output of the accelerator pedal sensor 26. The LNC volume may be obtained by actually measuring the volume of the LNC in advance.

Figure 3:
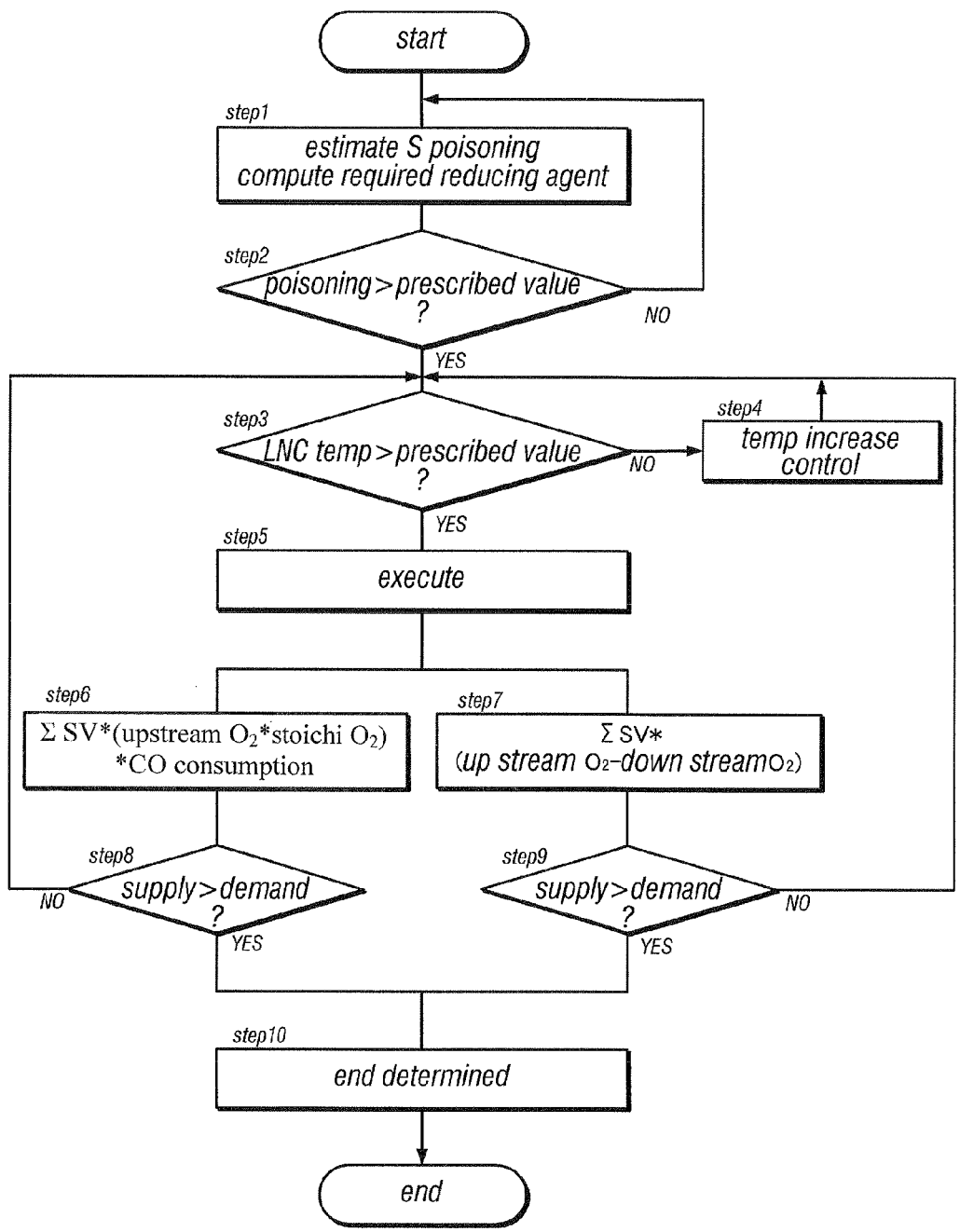
FIG. 3 is a control flowchart according to the present invention.

By multiplying the SV value and CO consumption rate to the integrated value of the difference between the output of the upstream $O_2$ sensor 27U and a value corresponding to the stoichiometric ratio in step 6 of FIG. 3, the change in the reducing agent consumption owing to the contact with the catalyst and changes in the reaction probability can be taken into account, and the required amount of the reducing agent can be evaluated even more accurately for each different operating condition of the engine.

In step 7 of FIG. 3, because the change in the CO consumption rate is already reflected in the difference between the outputs of the upstream $O_2$ sensor 27U and downstream $O_2$ sensor 27L, it is sufficient to multiply the value of the space velocity SV.

Thus, because the reducing agent consumption can be adequately accurately evaluated from the integrated value of the difference between the output of the upstream $O_2$ sensor 27U and a stoichiometric ratio by taking into account the CO consumption ratio and SV value, only one $O_2$ sensor is required, and this contributes to the reduction in the manufacturing cost and the saving of the mounting space.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A method for controlling a sulfur purge in an internal combustion engine provided with a NOX catalytic converter in an exhaust passage thereof, comprising:
    estimating an extent of sulfur deposition in the NOX catalytic converter;
    changing operating parameters of the engine from normal values so as to produce a reducing agent from exhaust gas in the exhaust passage and thereby carry out a sulfur purge in the NOX catalytic converter;

detecting an upstream air fuel ratio value corresponding to an air fuel ratio in an upstream part of the NOX catalytic converter;

detecting a downstream air fuel ratio value corresponding to an air fuel ratio in a downstream part of the NOX catalytic converter;

computing a difference between the upstream air fuel ratio detected by the first detector and a stoichiometric air fuel ratio;

detecting a temperature of the NOX catalytic converter;

detecting a CO consumption rate in the NOX catalytic converter according to the detected temperature of he NOX catalytic converter; and ending the sulfur purge based on one of the computed difference between the upstream air fuel ratio and stoichiometric air fuel ratio, and outputs of the upstream and downstream air fuel ratios.

2. The control method according to claim 1, further comprising detecting a space velocity of exhaust gas that enters the NOX catalytic converter, and taking into account the detected space velocity in determining an end of a sulfur purge process.

3. A control device for an internal combustion engine provided with a NOX catalytic converter in an exhaust passage thereof, comprising:

a control unit that estimates an extent of sulfur deposition in the NOX catalytic converter and changes operating parameters of the engine so as to produce a reducing agent in exhaust gas and thereby purge a sulfur content in the NOX catalytic converter; and a first detector for detecting an upstream air fuel ratio in an upstream part of the NOX catalytic converter;

a second detector for detecting a downstream air fuel ratio in a downstream part of the NOX catalytic converter;

a computing means for computing a difference between the upstream air fuel ratio detected by the first detector and a stoichiometric air fuel ratio;

a temperature detector for detecting a temperature of the NOX catalytic converter;

a CO consumption rate detector for detecting a CO consumption rate in the NOX catalytic converter according to the temperature of the NOX catalytic converter detected by the temperature detector;

a first sulfur purge end determining unit for determining an end of a sulfur purge process according to an output of the computing means and the CO consumption rate detected by the CO consumption rate detector; and a second sulfur purge end determining unit for determining an end of a sulfur purge process according to outputs of the first and second detectors;

wherein the control unit determines an end of a sulfur purge process when one of the first and second sulfur purge end determining unit has determined an end of a sulfur purge process.

4. The control device according to claim 1, further comprising a space velocity detector for detecting a space velocity of exhaust gas that enters the NOX catalytic converter, wherein the control unit is configured to take into account an output of the space velocity detector in determining an end of a sulfur purge process.

5. A computer program product having a computer-readable medium having computer-executable instructions for performing a method for controlling a sulfur purge in an internal combustion engine provided with a NOX catalytic converter in an exhaust passage thereof, the instructions comprising:

estimating an extent of sulfur deposition in the NOX catalytic converter;

changing operating parameters of the engine from normal values so as to produce a reducing agent from exhaust gas in the exhaust passage and thereby carry out a sulfur purge in the NOX catalytic converter;

detecting an upstream air fuel ratio value corresponding to an air fuel ratio in an upstream part of the NOX catalytic converter;

detecting a downstream air fuel ratio value corresponding to an air fuel ratio in a downstream part of the NOX catalytic converter;

computing a difference between the upstream air fuel ratio detected by the first detector and a stoichiometric air fuel ratio;

detecting a temperature of the NOX catalytic converter;

detecting a CO consumption rate in the NOX catalytic converter according to the detected temperature of the NOX catalytic converter; and ending the sulfur purge based on one of the computed difference between the upstream air fuel ratio and stoichiometric air fuel ratio, and outputs of the upstream and downstream air fuel ratios.

6. The computer program product according to claim 5, wherein the method further comprises detecting a space velocity of exhaust gas that enters the NOX catalytic converter, and taking into account the detected space velocity in determining an end of a sulfur purge process.

* * * * *